United States Patent [19]

Cherveny et al.

[11] Patent Number: 4,649,976
[45] Date of Patent: Mar. 17, 1987

[54] PNEUMATIC TIRE

[75] Inventors: Vincent J. Cherveny, Cuyahoga Falls; Frederick W. Miller, III, Akron; Richard C. Beard, Nortwest Massillon; Terry J. Waibel, Seville, all of Ohio; Jean C. Scherer, Waterloo, Belgium

[73] Assignee: The Goodyear Tire & Rubber Company, Akron, Ohio

[21] Appl. No.: 810,433

[22] Filed: Dec. 18, 1985

[51] Int. Cl.$^4$ .................. B60C 11/00; B60C 9/18; B60C 9/02
[52] U.S. Cl. ......................... 152/209 R; 152/526; 152/548
[58] Field of Search ............. 152/209, 556, 548, 526

[56] References Cited

U.S. PATENT DOCUMENTS

| 3,559,714 | 2/1971 | Verdier | 152/209 B |
| 3,674,077 | 7/1972 | Verdier | 152/209 R |
| 3,799,231 | 3/1974 | Boileau | 152/209 R |
| 3,875,986 | 4/1975 | Boileau | 152/209 R |
| 4,296,789 | 10/1981 | Roberts et al. | 152/209 R |
| 4,470,443 | 9/1984 | Eraud | 152/209 R |

FOREIGN PATENT DOCUMENTS

| 2912546 | 10/1980 | Fed. Rep. of Germany | 152/209 D |
| 0152604 | 9/1983 | Japan | 152/209 B |

OTHER PUBLICATIONS

1984 Tread Design Guide, p. 166, General ND Super Lugger ML-4.
1984 Tread Design Guide, p. 166, General ND Super Lugger II.
1984 Tread Design Guide, p. 166, General ND Waste Hauler Special.
1984 Tread Design Guide, p. 196, Alliance Industrial 502.
1984 Tread Design Guide, p. 201, General ND Super Lugger.
1984 Tread Design Guide, p. 205, Goodyear RL-2 Radial SemiXtra Tread.
1984 Tread Design Guide, p. 208, Orban Mining, Logging, Const. SML.
1984 Tread Design Guide, p. 208, Ram, Torc Trac.
1984 Tread Design Guide, p. 218, Carleton Rear Wheel.
1984 Tread Design Guide, p. 228, Prowler, Rear Wheel.
1984 Tread Design Guide, p. 229, Ram Rear Wheel.
1984 Tread Design Guide, p. 233, Van Ness Rear Wheel.
1984 Tread Design Guide, p. 247, Bandag Rock Lug.
1984 Tread Design Guide, p. 247, Bandag Rock Lug Modified.

Primary Examiner—Michael Ball
Attorney, Agent, or Firm—L. R. Drayer

[57] ABSTRACT

A pneumatic tire (10), designed for use on a military vehicle, comprises a single carcass ply (13) of aramid cords, a pair of steel cord belt plies (14, 15), and a ground-engaging tread portion (20). The ground-engaging tread portion is characterized by a plurality of series of independent traction elements (21), each series of traction elements extending from a lateral edge (22, 23) of the tread towards another lateral edge (22, 23) of the tread along a curved path. The traction elements in each series are separated from the next adjacent traction elements of that same series by straight grooves (24), the width of the straight grooves being less than the width of the curved grooves (25) separating circumferentially adjacent series of traction elements.

23 Claims, 4 Drawing Figures

PNEUMATIC TIRE

The present invention relates generally to pneumatic tires, and more specifically to a pneumatic tire intended for use on a military vehicle.

In view of the fact that a military vehicle may be operated under a variety of adverse conditions, both on and off of highways, the tires intended for use on such a vehicle must meet special requirements. A tire according to the present invention is intended for use on a light weight military vehicle, or similar civilian vehicles, slightly larger than the well known Jeep that has been in use since World War II. The dimensions of the tire are dictated by the dimensions of the vehicle itself, and the weight of the tire is important because such a vehicle has a specified overall weight. The tires may be used in conjunction with a run-flat device, and are required to have a higher resistance to penetration of the tread area by foreign objects than similar sized tires used on civilian type vehicles. This same tire is required to provide good traction under a variety of conditions, such as mud, sand, gravel, and snow.

There is provided in accordance with one aspect of the invention a pneumatic tire comprising: (a) a pair of axially spaced apart annular beads: (b) a single carcass ply of aramid cords extending between said beads and anchored around each of the beads, said aramid cords being disposed at an angle in the range of 80° to 90° with respect to, and at, the mid-circumferential plane of the tire: (c) a pair of juxtaposed belt plies of steel cords disposed radially outwardly of the carcass ply in the crown portion of the tire: and (d) a ground engaging tread portion disposed radially outwardly of the belt plies, said tread portion having first and second lateral edges and a plurality of series of independent traction elements, each series of traction elements extending from one lateral edge of the tread towards the other lateral edge of the tread along a curved path, the traction elements in each series being separated from the next adjacent traction elements of that same series by straight grooves, the width of said straight grooves being less than the widths of the curved grooves separating circumferentially adjacent series of traction elements.

There is provided in accordance with another aspect of the invention a size 37×12.50 R 16.5 LT pneumatic tire comprising: (a) a pair of axially spaced apart annular beads: (b) a single carcass ply of aramid cords extending between said beads and anchored around each of the beads, said aramid cords being disposed at an angle in the range of 80° to 90° with respect to, and at, the mid-circumferential plane of the tire: (c) a single pair of juxtaposed unfolded belt plies of steel cords, said steel cords being disposed at an angle in the range of 18° to 27° with respect to, and at, the mid-circumferential plane of the tire; and (d) a ground engaging tread portion disposed radially outwardly of the belt plies, said tread portion having 28 to 38 series of independent traction elements, each series of traction elements extending from a first lateral edge of the tread to a second lateral edge of the tread along a curved path, the traction elements in each series being separated from the next adjacent traction elements of that same series by straight grooves, the width of said straight grooves being less than the width of the curved grooves separating circumferentially adjacent series of traction elements, said tread portion having a net-to-gross ratio in the range of 45% to 55%.

There is provided in accordance with yet another aspect of the invention a pneumatic tire comprising: (a) a pair of axially spaced apart annular beads: (b) a single carcass ply of aramid cords extending between said beads and anchored around each of the beads, said aramid cords being disposed at an angle in the range of 80° to 90° with respect to, and at, the mid-circumferential plane of the tire; (c) a single pair of juxtaposed unfolded belt plies of steel cords, said steel cords being disposed at an angle in the range of 18° to 27° with respect to, and at, the mid-circumferential plane of the tire: and (d) a ground engaging tread portion disposed radially outwardly of the belt plies, said tread portion having first and second lateral edges and a plurality of series of independent traction elements, each series of traction elements extending from one lateral edge of the tread towards the other lateral edge of the tread along a curved path, every other series of traction elements including a traction element that extends to said first lateral edge of the tread but no traction element extending to said second lateral edge of the tread, and every other series of traction elements including a traction element extending to said second lateral edge of the tread but no traction element extending to said first lateral edge of the tread, the traction elements in each series being separated from the next adjacent traction elements of that same series by straight grooves, the width of said straight grooves being less than the width of the curved grooves separating circumferentially adjacent series of traction elements, said tread portion having a net-to-gross ratio in the range of 45% to 55%.

The invention can best be described with reference to the accompanying figures of the drawing in which.

Figure 2:
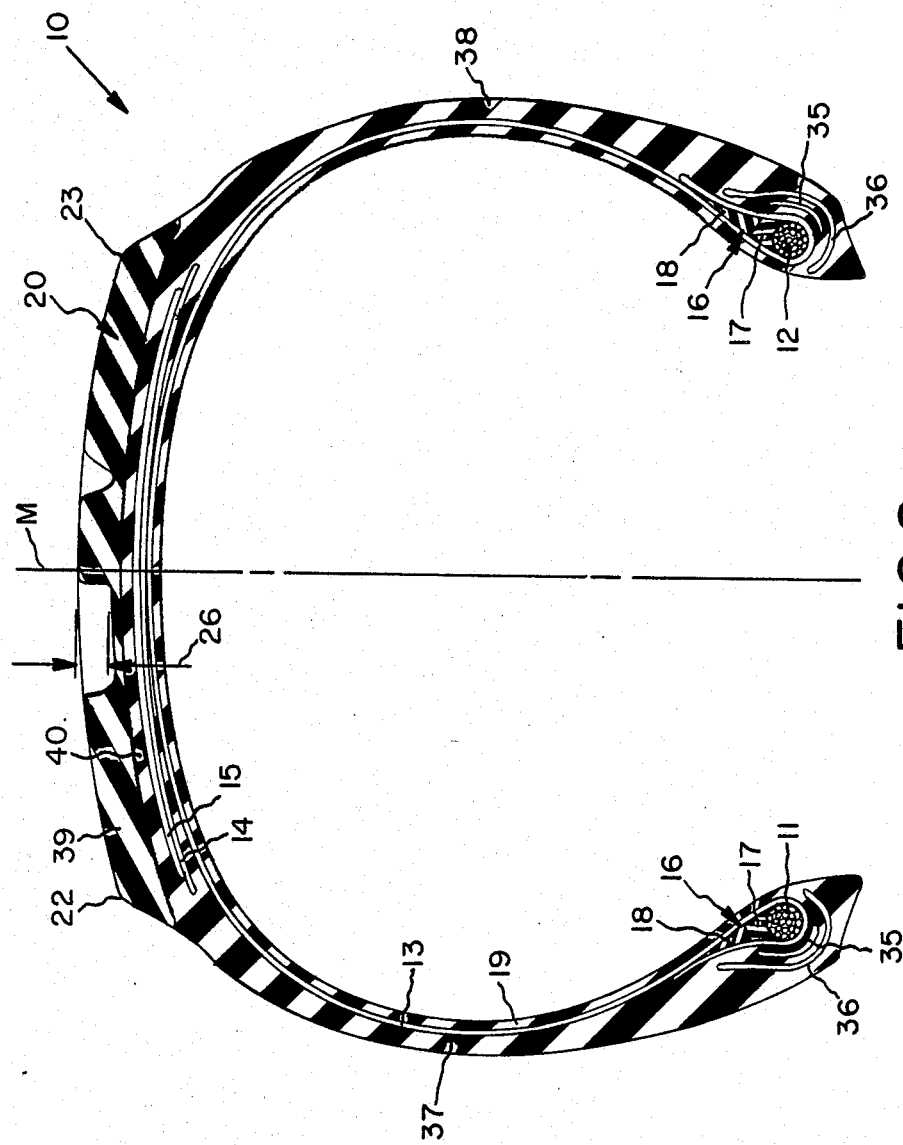
FIG. 2 is a radial cross-sectional view of the tire shown in FIG. 1.

Referring first to FIG. 2, there is illustrated a radial cross-sectional view of a tire 10 according to the preferred embodiment of the invention. It is understood that with the exception of the specific tread structure employed in each of the alternate embodiments disclosed herein, the structure of a tire according to the invention will be substantially the same in each of the embodiments. A tire manufactured in accordance with the preferred embodiment, which is intended for use on a specific military vehicle, has a size of 37×12.50 R 16.5 LT. That is to say, such a tire when mounted on a specified rim and inflated to the specified pressure has a maximum outside diameter of 37 inches (94 cm), a width at the widest portion of the tire of 12.50 inches (32 cm), and a nominal bead diameter of 16.5 inches (42 cm). A tire of this size, according to the preferred embodiment, has a weight of less than 29.5 kg (65 pounds), and preferably of about 28 kg (62 pounds). A tire according to the preferred embodiment has an aspect ratio of about 80. A tire according to the preferred embodiment of the invention is intended to be mounted upon a multiple piece rim (not shown) and to have a run-flat device (not shown) disposed within the inflation chamber of the tire.

As used herein, and in the appended claims, the terms "axial" and "axially" refer to directions parallel to the axis of rotation of a tire, and the terms "radial" and "radially" refer to directions perpendicular to the axis of rotation of a tire. The "aspect ratio" of a tire is the tire's cross-section height divided by the cross-section width.

A pair of axially spaced apart substantially inextensible annular beads 11,12 are disposed concentric with the axis of rotation of the tire. A single carcass ply 13 of aramid cords extends between the beads 11,12 and is anchored around each of the beads. The term "aramid" refers to a material that is an aromatic polyamide. The aramid cords of the carcass ply are substantially parallel to next adjacent cords and are disposed at an angle in the range of 80° to 90°, preferably 88° to 90°, with respect to, and at, the mid-circumferential plane M of the tire. A tire with this type of carcass ply is commonly referred to as a "radial ply tire". As used herein and in the appended claims, the "mid-circumferential plane" of a tire is a plane disposed perpendicular to the axis of rotation of a tire and midway between the sidewalls of the tire. In the preferred embodiment, the aramid cords have a denier of 1500/2, a diameter of 0.027 inches (0.7 mm), and are disposed 28 cords per inch (28 cords each 2.54 cm) as measured perpendicular to the cords. A single carcass ply of aramid cords is used in order to get a very strong carcass ply at a very low weight.

A pair of juxtaposed belt plies 14,15 of steel cords are disposed radially outwardly of the carcass ply 13 in the crown portion of the tire. The steel cords are substantially parallel to next adjacent cords and are disposed at an angle in the range of 18° to 27°, preferably 20° to 25°, most preferably 23°, with respect to, and at, the mid-circumferential plane M of the tire. In the preferred embodiment the belt plies are not folded, but it is understood that it is within the scope of the invention that one or both of the belt plies could be folded. As illustrated in FIG. 2, a tire according to the preferred embodiment has only a single pair of belt plies, but it is understood that a tire in accordance with the broad aspect of the invention could have more than one pair of belt plies. The steel cords of the belt plies of a tire according to the preferred embodiment have a construction of $3 \times 0.20 + 6 \times 0.38$, an outside diameter of at least 1.1 mm (0.045 inch), preferably 1.2 mm (0.47 inch), and are disposed such that there are 10 steel cords per inch (10 cords per 2.54 cm), as measured perpendicular to the cords. In accordance with well known tire engineering principles, the cords of one belt ply are inclined in a different direction with respect to the mid-circumferential plane from the steel cords of the other belt ply. The lateral edges of each belt ply are preferably enclosed in a strip of a suitable elastomeric material (not shown) in a manner that is well known in the tire art. The steel cords used in the belt plies of the preferred embodiment are larger than those normally used in a tire of this size, in order to provide a high resistance to penetration of the tread portion of the tire by a foreign object.

Disposed between the main portion of the carcass ply 13 and the turn-up portion of the carcass ply in each of the bead portions of the tire, there is disposed an annular elastomeric filler 16. This annular elastomeric filler strip is sometimes referred to in the tire art as a "bead filler" or an "apex". Preferably this annular elastomeric filler 16 comprises a radially inner portion 17 of a relatively hard compound to stiffen the bead area of the tire, and a radially outer portion 18 of a relatively soft compound to provide better flexing in the lower sidewall portion of the tire. One or more reinforcing layers of fabric are wrapped around the beads in manners well known in the tire art. In the preferred embodiment two nylon chippers 35,36 are disposed on the side of the carcass ply distal from the annular bead. An inner liner 19 of a substantially air impervious material is disposed radially and axially inwardly of the single carcass ply 13.

Figure 1:
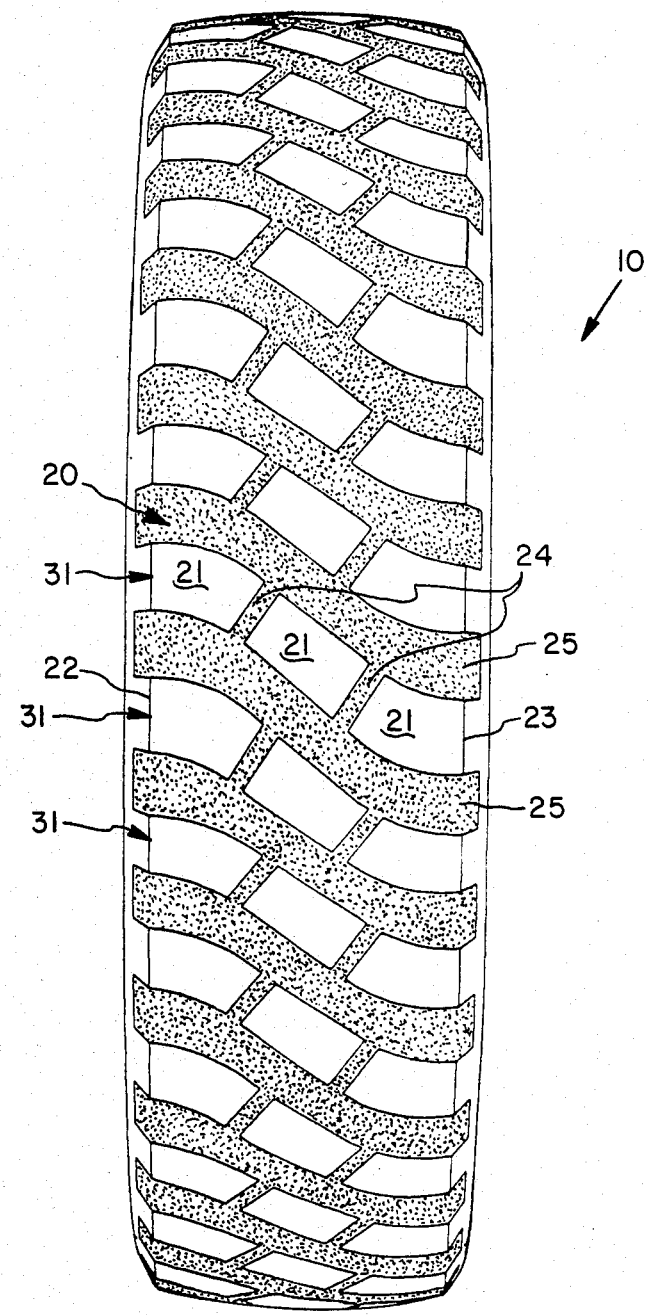
FIG. 1 is a front elevation view of the tread portion of a tire according to the preferred embodiment of the invention.

A ground engaging tread portion 20 is disposed radially outwardly of the belt plies 14,15. The structure of the tread portion of a tire according to the preferred embodiment of the invention can best be described by referring to FIG. 2 in conjunction with FIG. 1. The tread portion 20 has a pair of lateral edges 22,23 and a plurality of series 31 of independent traction elements 21. Each series of traction elements extends from a lateral edge 22,23 of the tread towards another lateral edge 22,23 of the tread along a curved path. The traction elements in each series of traction elements are separated from the next adjacent traction elements of that same series by straight grooves 24. The width of the straight grooves 24 is less than the width of the curved grooves 25 separating circumferentially adjacent series of traction elements. The tread portion has a net-to-gross ratio in the range 45% to 55%, preferably in the range of 49% to 51%. In the preferred embodiment the nonskid depth of the tread, as measured at 26 in FIG. 1, is in the range of 11 mm (0.43 inch) to 13 mm (0.51 inch), most preferably in the range of 0.44 inches to 0.46 inches. In a tire according to the preferred embodiment illustrated in FIGS. 1 and 2, each series 31 of traction elements extends from one lateral edge 22,23 of the tread to the other lateral edge 22,23 of the tread. Put another way, each series of traction elements includes traction elements that extend to each of the lateral edges of the tread. The lateral edges of a tread are determined from the footprint of a tire mounted upon the specified rim, inflated to the specified pressure, and subjected to the rated load.

It is also considered to be very important to have the proper number of series of traction elements disposed around the circumference of the tire in order to improve the traction of the tire in mud and snow. In a tire according to the preferred embodiment having a nominal rim diameter of 16.5 inches (42 cm) and an outside diameter of 37 inches (94 cm) there are in the range of 28 to 38 series, preferably 30 to 35 and most preferably 33 series of traction elements disposed around the tire.

In the preferred embodiment the tread portion has a radially outermost layer 39 comprised of one elastomeric compound, selected in accordance with principles well known in the tire art, and a radially inner layer 40 comprised of the same elastomeric material that is disposed axially outwardly of the carcass ply 13 in each sidewall 37,38 of the tire.

Figure 3:
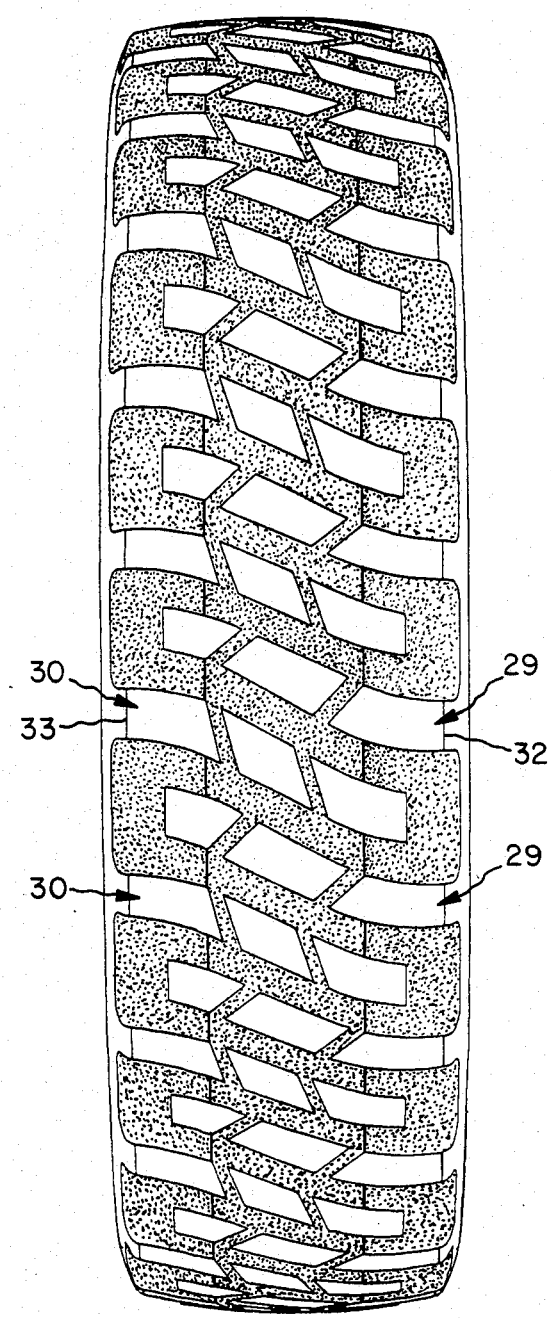
FIG. 3 is a front elevation view of the tread portion of a tire according to an alternate embodiment of the invention.
Figure 4:
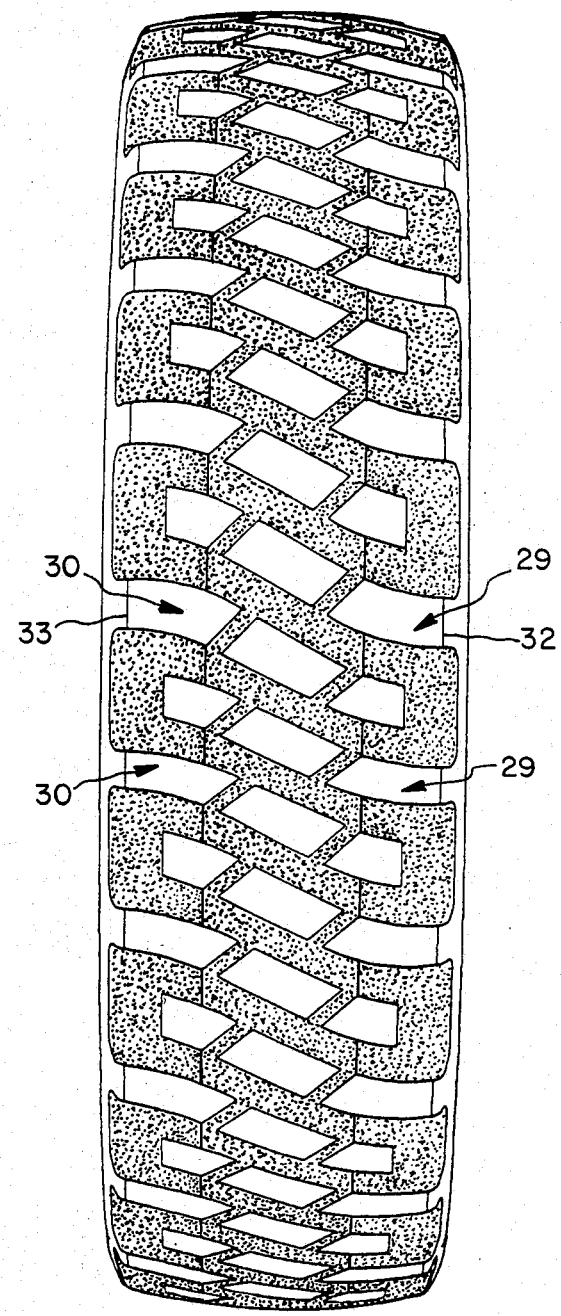
FIG. 4 is a front elevational view of the tread portion of a tire according to another alternate embodiment of the invention.

Referring to FIGS. 3 and 4, there are illustrated tread portions of alternate embodiments of the invention wherein every other series 29 of traction elements includes a traction element that extends to the first lateral edge 32 of the tread, but no traction element extending to the second lateral edge 33 of the tread. Conversely, every other series 30 of traction elements includes a traction element extending to the second lateral edge 33 of the tread, but no traction element extending to the first lateral edge 32 of the tread. It is believed that by staggering the traction elements at the edges of the tread the traction performance of the tire under certain operating conditions may be improved. A tire according to the alternate embodiments of size 37×12.50 R 16.5 LT has in the range of 45 to 55, preferably 48 to 52, series of traction elements, which is greater than the number of series of traction elements in the preferred embodiment, while still having a net-to-gross ratio in the range of 45% to 55%.

In all other respects the structure of tires according to the alternate embodiments is substantially the same as that of the preferred embodiment set forth herein.

It will be apparent to those skilled in the tire art that changes and modifications may be made in the invention without deviating from the scope of the invention. For example, the straight grooves separating the traction elements in any series of traction elements may be oriented the same in every series of elements around the tire as shown in FIG. 4, or they may be oriented differently in circumferentially adjacent series of traction elements as illustrated in FIG. 3.

We claim:

1. A pneumatic tire having a nominal bead diameter of not greater than 16.5 inches comprising:
   (a) a pair of axially spaced apart annular beads;
   (b) a single carcass ply of aramid cords extending between said beads and anchored around each of the beads, said aramid cords being disposed at an angle in the range of 80° to 90° with respect to, and at, the mid-circumferential plane of the tire;
   (c) a single pair of juxtaposed belt plies of steel cords disposed radially outwardly of the carcass ply in the crown portion of the tire; and
   (d) a ground engaging tread portion disposed radially outwardly of the belt plies, said tread portion having first and second lateral edges and a plurality of series of independent traction elements, each series of traction elements extending from one lateral edge of the tread towards the other lateral edge of the tread along a curved path, the traction elements in each series being separated from the next adjacent traction elements of that same series by straight grooves, the width of said straight grooves being less than the widths of the curved grooves separating circumferentially adjacent series of traction elements.

2. A pneumatic tire according to claim 1 wherein said tread portion has a net-to-gross ratio in the range of 45% to 55%.

3. A pneumatic tire according to claim 1 wherein said belt plies are not folded.

4. A pneumatic tire according to claim 2 wherein said belt plies are not folded.

5. A pneumatic tire according to any one of claims 1 through 4 wherein said tire is a size 37×12.50 R 16.5 LT tire.

6. A pneumatic tire according to any one of claims 1 through 4 wherein each series of traction elements extends from said first lateral edge of the tread to said second lateral edge of the tread.

7. A pneumatic tire according to claim 5 wherein each series of traction elements extends from said first lateral edge of the tread to said second lateral edge of the tread.

8. A pneumatic tire according to any one of claims 1 through 4 wherein every other series of traction elements includes a traction element that extends to said first lateral edge of the tread but no traction element extending to said second lateral edge of the tread, and every other series of traction elements includes a traction element extending to said second lateral edge of the tread but no traction element extending to said first lateral edge of the tread.

9. A pneumatic tire according to claim 5 wherein every other series of traction elements includes a traction element that extends to said first lateral edge of the tread but no traction element that extends to said second lateral edge of the tread, and every other series of traction elements includes a traction element extending to said second lateral edge of the tread but no traction element extending to said first lateral edge of the tread.

10. A tire according to claim 7 having in the range of 30 to 35 series of traction elements.

11. A tire according to claim 9 having in the range of 45 to 55 series of traction elements.

12. A size 37×12.50 R 16.5 LT pneumatic tire comprising:
    (a) a pair of axially spaced apart annular beads;
    (b) a single carcass ply of aramid cords extending between said beads and anchored around each of the beads, said aramid cords being disposed at an angle in the range of 80° to 90° with respect to, and at, the mid-circumferential plane of the tire;
    (c) a single pair of juxtaposed unfolded belt plies of steel cords, said steel cords being disposed at an angle in the range of 18° to 27° with respect to, and at, the mid-circumferential plane of the tire; and
    (d) a ground engaging tread portion disposed radially outwardly of the belt plies, said tread portion having 28 to 38 series of independent traction elements, each series of traction elements extending from a first lateral edge of the tread to a second lateral edge of the tread along a curved path, the traction elements in each series being separated from the next adjacent traction elements of that same series by straight grooves, the width of said straight grooves being less than the width of the curved grooves separating circumferentially adjacent series of traction elements, said tread portion having a net-to-gross ratio in the range of 45% to 55%.

13. A size 37×12.50 R 16.5 LT pneumatic tire according to claim 12 wherein the non-skid depth of the tread at the mid-circumferential plane is in the range of 11 mm (0.43 inch) to 13 mm (0.51 inch).

14. A size 37×12.50 R 16.5 LT pneumatic tire according to either of claims 12 or 13 wherein said aramid cords have a denier of 1500/2.

15. A size 37×12.50 R 16.5 LT pneumatic tire according to either of claims 12 or 13 wherein each steel cord of the belt plies has an overall diameter of at least 1.1 mm (0.045 inch).

16. A size 37×12.50 R 16.5 LT pneumatic tire according to claim 15 wherein said aramid cords have a denier of 1500/2 and each steel cord of the belt plies has an overall diameter of at least 1.1 mm (0.045 inch).

17. A pneumatic tire comprising:
    (a) a pair of axially spaced apart annular beads;
    (b) a single carcass ply of aramid cords extending between said beads and anchored around each of the beads, said aramid cords being disposed at an angle in the range of 80° to 90° with respect to, and at, the mid-circumferential plane of the tire;
    (c) a single pair of juxtaposed unfolded belt plies of steel cords, said steel cords being disposed at an angle in the range of 18° to 27° with respect to, and at, the mid-circumferential plane of the tire; and (d) a ground engaging tread portion disposed radially outwardly of the belt plies, said tread portion having first and second lateral edges and a plurality of series of independent traction elements, each series of traction elements extending from one lateral edge of the tread towards the other lateral edge of the tread along a curved path, every other series of traction elements including a traction element that extends to said first lateral edge of the tread but no traction element extending to said second lateral edge of the tread, and every other series of traction elements including a traction element extending to said second lateral edge of the tread but no traction element extending to said first lateral edge of the tread, the traction elements in each series being separated from the next adjacent traction elements of that same series by straight grooves, the width of said straight grooves being less than the width of the curved grooves separating circumferentially adjacent series of traction elements, said tread portion having a net-to-gross ratio in the range of 45% to 55%.

18. A pneumatic tire according to claim 17 wherein said tread portion has in the range of 45 to 55 series of independent traction elements.

19. A pneumatic tire according to claim 17 wherein said tire has a size of 37×12.50 R 16.5 LT and said tread portion has in the range of 45 to 55 series of independent traction elements.

20. A pneumatic tire according to any one of claims 17 to 19 wherein the non-skid depth of the tread at the mid-circumferential plane is in the range of 11 mm (0.43 inch) to 13 mm (0.51 inch).

21. A pneumatic tire according to any one of claims 17 to 19 wherein said aramid cords have a denier of 1500/2.

22. A pneumatic tire according to any one of claims 17 to 19 wherein each steel cord of the belt plies has an overall diameter of at least 1.1 mm (0.045 inch).

23. A pneumatic tire according to claim 22 wherein said aramid cords have a denier of 1500/2 and each steel cord of the belt plies has an overall diameter of at least 1.1 mm (0.045 inch).

* * * * *